(No Model.)
M. PIGOT.
PROTECTING DEVICE FOR HORSES' FEET.
No. 476,301. Patented June 7, 1892.
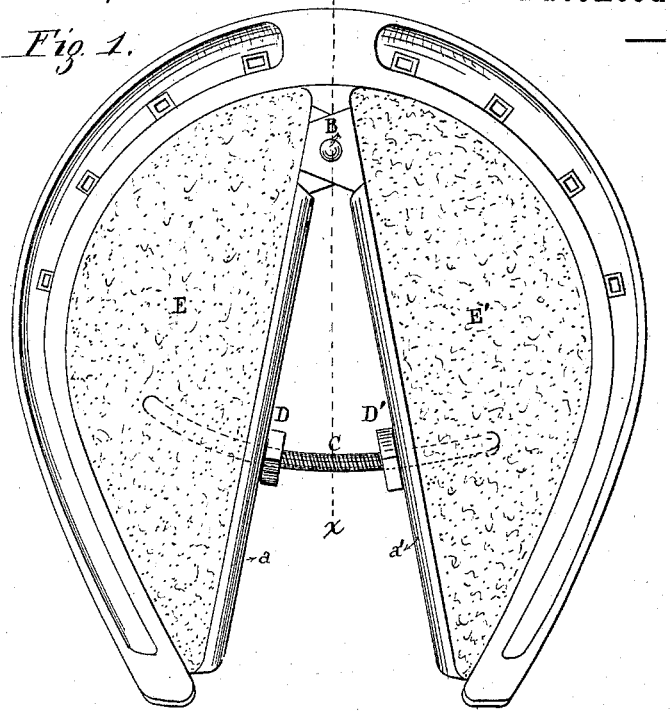
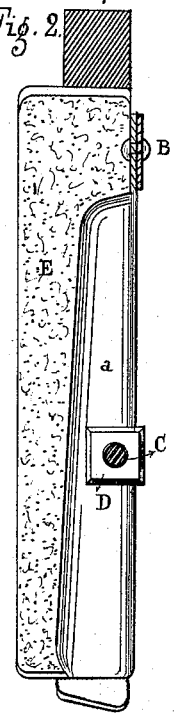
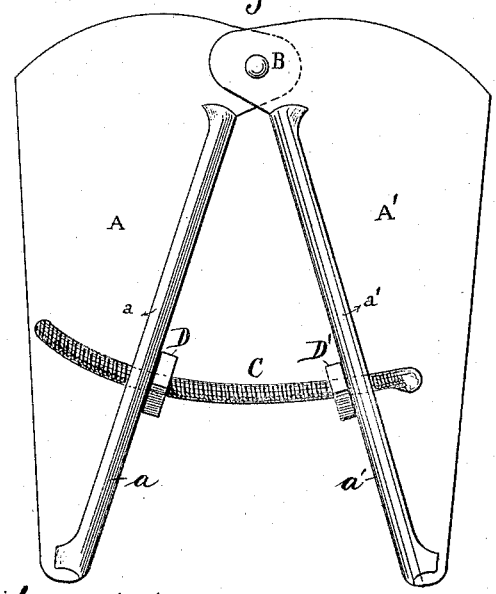
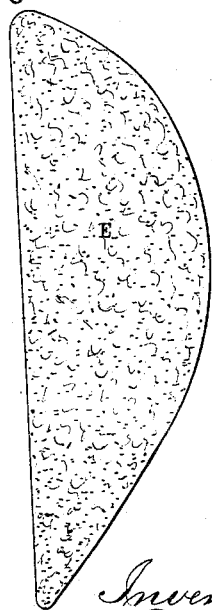
Witnesses:-
H. B. Kingsbery
C. Worthup
Inventor:-
Martin Pigot,
by his attorney
Wm. E. Poulter

UNITED STATES PATENT OFFICE.

MARTIN PIGOT, OF BRUSSELS, BELGIUM.

PROTECTING DEVICE FOR HORSES' FEET.

SPECIFICATION forming part of Letters Patent No. 476,301, dated June 7, 1892.

Application filed December 19, 1891. Serial No. 415,646. (No model.) Patented in Belgium September 30, 1890, No. 91,992; in France February 28, 1891, No. 198,606; in England March 7, 1891, No. 4,128, and in Germany March 13, 1891, No. 59,503.

*To all whom it may concern:*

Be it known that I, MARTIN PIGOT, a subject of the King of the Belgians, residing at Brussels, in Belgium, have invented certain new and useful Improvements in Protecting Devices for Horses' Feet, (for which I have obtained Letters Patent in Belgium, No. 91,992, dated September 30, 1890; in France, No. 198,606, dated February 28, 1891; in England, No. 4,128, dated March 7, 1891, and in Germany, No. 59,503, dated March 13, 1891,) of which the following is a specification.

This invention relates to an improved lining for horseshoes adapted to prevent horses from slipping, stumbling, and sustaining violent shocks on the pavement such as will occasion falls. This result is obtained by the employment of sheets or plates of cork firmly locked or clamped between the inner surface of the horseshoe and the edges of a hinged metal piece or clamp presently to be described.

Hitherto the attempts to use india-rubber, rope, and the like for the purpose stated have not been crowned with success, as they were apt to become slippery themselves after a certain time. Especially india-rubber under the influence of dampness becomes soft and greasy, and thus facilitates slipping instead of preventing it.

The application of this invention entails the additional advantage of protecting the hoof from excessive heat, as the portion known as the "frog" remains exposed.

The invention will be best understood by reference to the accompanying drawings, in which—

Figure 1 is a plan of the treading-surface of the horseshoe with the improved protecting device and cork plates attached to it. Fig. 2 is a section of Fig. 1 on line $x\,x$. Fig. 3 is a plan of the clamp, and Fig. 4 is a plan of one of the plates of cork or the like.

The clamp which is to retain in position the plates of cork E E' consists of two similar plates or soles A A', made of thin sheet metal. They are provided at their inner edges with flanges $a\,a'$ and are connected by a pivot or hinge B. Near the middle of these hinged plates, near the point corresponding to the position of the frog, there is arranged a slightly-curved screwed rod C, which may be fitted either permanently or adjustably to one of the hinged plates, say A', while its opposite end passes through the flanges $a\,a'$ of both plates A A'. This screw is provided with two nuts D D', each of which is placed against one of the flanges $a\,a'$. It will be understood that the distance the two hinged plates are held apart by the said screw depends on the size of the horseshoe.

In order to provide a horseshoe with this improved protecting device, the hinged plates are inserted or slid between the hoof and the shoe, and then plates of cork or similar material are placed upon the said hinged plates between their flanges and the inner surfaces or walls of the shoe, whereupon the fitting is completed by screwing the nuts D D', so as to cause the plates of cork E E' or the like to be firmly clamped between the flanges $a\,a'$ and the sides of the shoe.

For tightening the nuts D D' an ordinary key or spanner may be used, as there is sufficient room left for it at the frog portion of the hoof.

The details of construction and shape of the before-described device may be modified without departure from the spirit of the invention.

I claim—

1. The combination, with a horseshoe, of metallic plates hinged together near one end and provided upon their opposing edges with flanges, as described, blocks of cork or the like arranged between said flanges and the inner edge of the shoe, and a curved threaded rod connecting said plates and provided with nuts adapted to be adjusted thereupon to cause the spreading of the plates, for the purpose specified.

2. The combination, with a horseshoe, of metallic plates hinged together near one end and provided with diverging opposing edges whereby to expose the frog of the hoof, said edges being provided with flanges, as described, blocks of cork or the like arranged between said flanges and the inner edge of the shoe, a curved rod passing through the flanges and spanning the space between the same, and nuts adapted to be adjusted upon said rod to cause the spreading of the plates, for the purpose specified.

In testimony whereof I have hereto set my hand in the presence of the two subscribing witnesses.

MARTIN PIGOT.

Witnesses:
CHARLES D. NISSCHEE,
GREGORY PHELAN.